US012451623B2

(12) United States Patent
Wojtula et al.

(10) Patent No.: US 12,451,623 B2
(45) Date of Patent: Oct. 21, 2025

(54) ELECTRICAL CONNECTOR HAVING A FERRULE WITH CLINCHED ARMS FOR SHIELDED FUNCTIONALITY

(71) Applicant: Aptiv Technologies AG, Schaffhausen (CH)

(72) Inventors: Michal Wojtula, Cracow (PL); Dominik Wrzesien, Konskie (PL); Pawel Kruczek, Cracow (PL); Maciej Sikora, Liszki (PL)

(73) Assignee: APTIV TECHNOLOGIES AG, Schaffhausen (CH)

( * ) Notice: Subject to any disclaimer, the term of this patent is extended or adjusted under 35 U.S.C. 154(b) by 344 days.

(21) Appl. No.: 18/227,391

(22) Filed: Jul. 28, 2023

(65) Prior Publication Data

US 2024/0039180 A1 Feb. 1, 2024

(30) Foreign Application Priority Data

Jul. 28, 2022 (GB) ...................................... 2211001

(51) Int. Cl.
*H01R 9/05* (2006.01)
*H01R 13/22* (2006.01)
*H01R 13/53* (2006.01)

(52) U.S. Cl.
CPC ........... *H01R 9/0518* (2013.01); *H01R 13/22* (2013.01); *H01R 13/53* (2013.01)

(58) Field of Classification Search
CPC ...... H01R 9/0518; H01R 13/22; H01R 13/53; H01R 4/20; H01R 13/65914;
(Continued)

(56) References Cited

U.S. PATENT DOCUMENTS 4,051,323 A * 9/1977 Churla ................. H01R 9/0512 174/84 C
4,415,223 A * 11/1983 Asick ................... H01R 9/0518 439/879

(Continued)

FOREIGN PATENT DOCUMENTS

CN 118367379 A * 7/2024 ........... H01R 13/502
DE 102015213674 A1 1/2016

(Continued)

OTHER PUBLICATIONS

Search Report for Application No. GB2211001.9; Dated Jan. 25 & Jan. 26, 2023., 3 pages.

*Primary Examiner* — Travis S Chambers
(74) *Attorney, Agent, or Firm* — Billion & Armitage

(57) ABSTRACT

An electrical connector includes a ferrule configured to receive a portion of a first conductive wire of a high voltage electrical cable. The ferrule is configured to fasten to a cable shield which electrically shields the first conductive wire and to electrically connect the cable shield with a second conductive wire of the high voltage electrical cable. The ferrule has two annular portions. One of the two annular portions has a clinched arm arranged to pinch or clinch the other of the two annular portions. The ferrule is aligned such that the first conductive wire extends through the ferrule in the longitudinal direction and the clinched arm has a free end folded along the longitudinal direction. The electrical connector further includes a crimp portion configured to be connected to the ferrule and crimped to the second conductive wire.

16 Claims, 5 Drawing Sheets

(58) Field of Classification Search
CPC .. H01R 13/6592; H01R 4/183; H01R 43/048; H01R 4/184; H01R 11/28; H01R 13/6591; H01R 43/16; H02G 15/068
See application file for complete search history.

(56) References Cited

U.S. PATENT DOCUMENTS

| | | | | |
|---|---|---|---|---|
| 5,033,982 | A | 7/1991 | Lucas | |
| 5,736,678 | A | 4/1998 | Kobayashi | |
| 8,777,643 | B2 * | 7/2014 | De France | H01R 4/46 439/99 |
| 9,196,976 | B2 * | 11/2015 | De France | H01R 9/0521 |
| 9,933,095 | B2 * | 4/2018 | Deisinger | F16L 33/02 |
| 2015/0118917 | A1 * | 4/2015 | Poma | H01R 4/184 439/877 |
| 2024/0275088 | A1 * | 8/2024 | Nozaki | H01R 13/04 |

FOREIGN PATENT DOCUMENTS

| | | | | |
|---|---|---|---|---|
| EP | 3876351 | A1 * | 9/2021 | H01R 13/6585 |
| GB | 960291 | A * | 6/1964 | H01R 9/0512 |
| KR | 20180045216 | A | 5/2018 | |
| PL | 191690 | B1 * | 6/2006 | H01R 4/485 |
| WO | 2012008520 | A1 | 1/2012 | |

* cited by examiner

ELECTRICAL CONNECTOR HAVING A FERRULE WITH CLINCHED ARMS FOR SHIELDED FUNCTIONALITY

CROSS-REFERENCE TO RELATED APPLICATION

This application claims benefit of priority to Patent Application No. GB 2211001.9 filed in the UK Intellectual Property Office on Jul. 28, 2022, the entire disclosure of which is hereby incorporated by reference.

TECHNICAL FIELD OF THE INVENTION

The present disclosure relates in general to the field of electrical cables, and more particularly the field of shielded cables used for conducting high voltage current. The electrical cables are intended to be used in any kind of industries, in particular automotive industry.

BACKGROUND

Shielded electrical cables are known. For example, the document KR 20180045216A discloses a braided shield having a complex connection. Further, the document U.S. Pat. No. 5,033,982 discloses an electrical connector for high voltage having a plastic shield.

Further, designs with a ferrule to be connected to an electrical shield are known in the art. For example, as shown in FIG. 8 of the present description, a ferrule is provided with a protrusion to fix two wound portions of the ferrule. Another example known in the art is the ferrule of FIG. 9 of the present description, with a ferrule having a weld to fix two wound portions of the ferrule. However, in the two latter ferrules, there is a problem of break or reopening of the ferrule when the ferrule is crimped on the electrical shield, when this crimping is done thanks to a press, a tool or the like, or when there are vibrations in use. That is, the electrical connection between the ferrule and the electrical shield is poor or lost, and the ferrule may fall from the wire or from the electrical shield on which it is crimped. In addition, there is the possibility to provide the weld on an inner side and on an outer side of the ferrule, but it is both not sufficient and costly. The same applies even the weld is fully penetrating the ring of the ferrule, to have a complete welding: this may not be sufficient to avoid a break of the weld, and this is also time consuming and costly. In addition, this may require an additional inspection of the ferrule to check the integrity of the ferrule (i.e., no break or no beginning of rupture). Still another example known in the art is illustrated in FIG. 10 of the present description, and is about an electrical shield provided with an outer portion in the longitudinal direction, along with a clip for assembling the outer portion of the electrical shield with an accessory cable (i.e. second cable, to be compared with a main cable, i.e. first cable) to be connected with the electrical shield, so as to perform the function of shielding. That is, with the clip, there is a risk to loosen the electrical connection between the braids of both the electrical shield and the accessory cable. Further, there is a risk of unstable connection resistance, which is changing after every cable movement, and a risk of loosening or break of the accessory cable, at the level of the clip. The same applies with an assembly with a shrinking tube instead of the clip.

Thereby, there is a need for solving the above-mentioned drawback, and in particular the problem of electromagnetic induced current on the shield for high current application, while improving the lifetime of the connection of the shield and providing a simple connection. That is, there is a need of improvement of the connection between the accessory cable (i.e., second cable to be compared with a main cable, i.e., first cable) and the electrical shield. Further, there is a need for improvement of the manufacturing of the ferrule, and during the crimping process, which creates some stress and load on the ferrule, leading to unwanted breakage of the ferrule.

SUMMARY

One aim of the present disclosure is, in a first aspect, to solve the drawbacks of the prior art and to improve the electrical connectors, in particular those used in combination with electrical cable having a cable shield, or electrical shield, and to propose an electrical connector for a high voltage electrical cable, the cable having: a first conductive wire, a second conductive wire, a cable shield arranged to electrically shield the first conductive wire. The cable extends in a longitudinal direction. The electrical connector has a crimp portion configured for crimping the second conductive wire, a ferrule connected to the crimp portion and configured to receive at least a portion of the first conductive wire, and the ferrule is arranged to fasten the cable shield and electrically connect the cable shield with the second conductive wire. The ferrule has two annular portions, and one of the two annular portions has at least one clinched arm arranged to pinch or clinch the other of the two annular portions. The ferrule is aligned such that the first conductive wire extends through the ferrule in the longitudinal direction and the at least one clinched arm has a free end folded along the longitudinal direction.

The high voltage electrical cable may be also called electrical cable or cable. The crimp portion may be also called extended portion.

The ferrule is arranged to fasten the cable shield and electrically connect the cable shield with the second conductive wire, via the crimp portion.

This allows to propose a clean, easy, and safe assembly and to improve the lifetime connection of the shield and the connection of the two annular portions of the ferrule, after the crimping process of the ferrule onto the electrical shield. Further, this can be used with different cable sizes and shield wires, which means this is scalable. Still further, this allows for an easier manufacturing with a safe and repeatable processing, which could be parametric. Still further, this allows for different crimp variants of the ferrule, which is thereby modular and easily adaptable to a wide variety of design. In particular, the crimping may be circular, hexagonal or cat ear crimp, not being limited to theses shapes. Still further, this allows for a free orientation, but it can be also used in a specified or defined position. In addition, the usage of these ferrules avoids broken shield strands, and the shield strands orientation may be given by the ferrule. Besides, this allows to enhance the electromagnetic compatibility of the electrical cable.

In addition, this allows to avoid any breakage of the ferrule after the crimping process. Indeed, the orientation of the free end of the at least one clinched arm allows to reduce the stress and the constraint on the ferrule during and after the crimping process and allows to avoid or reduce the risk of break or loose of the ferrule, at the level of the at least one clinched arm. That is, this solution eliminates possibility of disconnection during crimping process since the at least one clinched arm is perpendicular to the sheet metal movement (i.e., to the movement of the ferrule, or the movement of an inner part or outer part of the ferrule).

Advantageously, a rotation axis of the clinched arm during bending or folding of the at least one clinched arm is perpendicular to the longitudinal direction.

Advantageously, the at least one clinched arm is arranged to be bent or folded back in the longitudinal direction.

Advantageously, the clinched arm is arranged to cover an outer cylindrical surface of the other of the two annular portions.

This allows to reduce the stress and constraint during and after the crimping process as mentioned above.

Advantageously, the two annular portions are half portions wound to be assembled and linked by the at least one clinched arm. The half portions are preferably made from a sheet of metal, such as steel or copper, or any suitable material, in particular conductive materials.

Advantageously, the other of the two annular portions has at least one abutting portion arranged to abut with the at least one clinched arm.

Advantageously, the abutting portion is a stop lock portion, allowing to stop and lock the movement of the annular portions.

Advantageously, the other of the two annular portions has at least one recess portion arranged to receive the at least one clinched arm.

Advantageously, the at least one clinched arm is arranged at an end of the one of the two annular portions. This allows to ensure a correct positioning of the two annular portions of the clinched arm and the abutting portions, thereby leading to the correct shape of the ferrule, while reducing the stress.

Advantageously, the ferrule, the crimp portion and the cable shield are formed of a conductive material, such as metal (copper, aluminum, steel, not being limited to such materials).

Advantageously, the ferrule may be crimped on a portion of the cable shield.

Advantageously, the ferrule may have an inner part and an outer part, and the ferrule is arranged to sandwich the portion of the cable shield between the inner part and the outer part.

Advantageously, the inner part may have a shoulder portion arranged to abut the outer part. This allows for a simplified and more robust electrical connection and fastening, while improving the lifetime. Further, this allows to improve the shield strand orientation and to avoid any broken shield strands. Still further, this allows for a simplified and more robust connection of the components of the ferrule, and a more precise manufacturing.

Advantageously, the crimp portion may have at least one first arm arranged to be crimped on a conductive portion of the second conductive wire.

Advantageously, the crimp portion may have at least one second arm arranged to be crimped on an insulation portion of the second conductive wire.

Advantageously, the crimp portion may have at least one attachment arm partly arranged in at least one opening of the outer part or in at least one opening of the ferrule. This allows to provide a simplified and robust connection between the ferrule and the second conductive wire and between the outer part and the crimp portion.

Advantageously, the at least one attachment arm is arranged to surround the portion of the cable shield. This allows to provide a simplified and robust connection between the ferrule and cable shield.

Advantageously, the crimp portion is integral with the outer part or with the ferrule. This allows for a simplified construction of the electrical connector and an easier manufacturing of the electrical connector.

Advantageously, the at least one first arm has at least one recess.

Advantageously, the crimp portion is arranged to be outside the first conductive wire when mounted on the electrical cable, at least partially. This allows to divert the induced current in the cable shield outside the first conductive wire, through the conductive portion of the second conductive wire.

One aim of the present disclosure is, in a second aspect, to solve the drawbacks of the prior art and to improve the electrical cables, in particular those having a cable shield, or electrical shield, and to propose an electrical cable for high voltage current, having: a first conductive wire, a cable shield arranged to electrically shield the first conductive wire, characterized in that the electrical cable further has a second conductive wire, and an electrical connector according to the first aspect, in particular having a ferrule arranged to fasten and electrically connect the cable shield and the second conductive wire.

This allows to propose a clean, easy, and safe assembly and to improve the lifetime connection of the shield. Further, this can be used with different cable sizes and shield wires, which means this is scalable. Still further, this allows for an easier manufacturing with a safe and repeatable processing, which could be parametric. Still further, this allows for different crimp variants of the ferrule and the electrical connector, which is thereby modular and easily adaptable to a wide variety of design. In particular, the crimping may be circular, hexagonal or cat ear crimp, not being limited to theses shapes. Still further, this allows for a free orientation, but it can be also used in a specified or defined position. In addition, the usage of these ferrules avoids broken shield strands, and the shield strands orientation may be given by the ferrule. Besides, this allows enhancement of the electromagnetic compatibility of the electrical cable.

In addition, this allows avoidance of any breakage of the ferrule after the crimping process. Indeed, the orientation of the free end of the at least one clinched arm allows to reduce the stress and the constraint on the ferrule during and after the crimping process and allows to avoid or reduce the risk of break or loose of the ferrule, at the level of the at least one clinched arm. That is, this solution eliminates possibility of disconnection during crimping process because the at least one clinched arm is perpendicular to the sheet metal movement (i.e., to the movement of the ferrule, or the movement of an inner part or outer part of the ferrule).

Advantageously, the ferrule may be crimped (or pinched, fastened, or attached) on a portion of the cable shield.

Advantageously, the ferrule may be made from a conductive material, such as metal, copper, steel, stainless steel, or the like.

Advantageously, the cable shield may have a plurality of strands.

Advantageously, the ferrule may have an inner part and an outer part, and the portion of the cable shield is sandwiched between the inner part and the outer part.

Advantageously, the inner part may have a shoulder portion arranged to abut the outer part. This allows for a simplified and more robust electrical connection and fastening, while improving the lifetime. Further, this allows to improve the shield strand orientation and to avoid any broken shield strands. Still further, this allows for a simplified and more robust connection of the components of the ferrule, and a more precise manufacturing.

Advantageously, the extended portion may have at least one first arm crimped on a conductive portion of the second conductive wire.

Advantageously, the extended portion may have at least one second arm crimped on an insulation portion of the second conductive wire.

Advantageously, the extended portion may have at least one attachment arm (or third arm) partly arranged in at least one opening of the outer part. This allows to provide a simplified and robust connection between the ferrule and the second conductive wire and between the outer part and the ferrule.

Advantageously, the portion of the cable shield is surrounded by the at least one attachment arm. This allows to provide a simplified and robust connection between the ferrule and cable shield.

Advantageously, the extended portion is integral with the outer part. This allows for a simplified construction of the ferrule and an easier manufacturing of the electrical cable.

Advantageously, the at least one first arm has at least one recess.

Advantageously, the at least one recess is in a perpendicular direction of the extended portion.

Advantageously, the extended portion extends in a longitudinal direction of the electrical cable. Advantageously, the first conductive wire has at least one conductive portion, and the electrical cable further has an inner insulation and an outer insulation. The inner insulation is arranged to surround the at least one conductive portion, and the cable shield is arranged between the inner insulation and the outer insulation.

Advantageously, the first conductive wire has at least one conductive portion.

Advantageously, the first conductive wire further has an inner insulation and an outer insulation. The inner insulation is arranged to surround the at least one conductive portion, and the cable shield is arranged between the inner insulation and the outer insulation. This allows to provide the electrical cable with an electrical shielding functionality. Thereby, a conductive portion of the second conductive wire is electrically connected with the cable shield.

Advantageously, the second conductive wire is arranged outside the first conductive wire.

This allows to divert the induced current in the cable shield outside the first conductive wire, through the conductive portion of the second conductive wire.

Advantageously, the electrical cable has a plurality of second wires.

Advantageously, the electrical connector has a plurality of first arms arranged to crimp the conductive portions of the plurality of second wires.

Advantageously, the plurality of first arms is arranged to crimp the conductive portions of the plurality of second wires together or separately. In other words, one crimp claw may crimp one or more wires.

Advantageously, the plurality of second wires may be placed on opposite sides of the first conductive wire, or close by, or equally spaced.

Advantageously, the plurality of first arms is connected to a plurality of intermediate portions or to a common intermediate portion.

Advantageously, the electrical connector (crimp portion) has a plurality of second arms arranged to be connected to one or more second conductive wires.

Advantageously, the electrical connector (crimp portion) has a plurality of third arms arranged to be connected to one or more second conductive wires. This allows to connect the cable shield with several second conductive wires, to enhance the diversion of induced current in the cable shield or to ensure the function if a connection is missed.

A third aspect of the present disclosure relates to a method for manufacturing the electrical cable according to the second aspect and/or an electrical cable equipped with the electrical connector according to the first aspect, including: providing a first conductive wire with a cable shield, fastening and electrically connecting the electrical connector of the first aspect with the cable shield and a second conductive wire. This allows to provide a simplified method for manufacturing an electrical cable having improved shielding functionality while providing a more robust electrical cable, in particular a more robust connection of the cable shield while diverting the induced current in the cable shield. In addition, this allows to avoid any breakage of the ferrule after the crimping process. Indeed, the orientation of the free end of the at least one clinched arm allows to reduce the stress and the constraint on the ferrule during and after the crimping process and allows to avoid or reduce the risk of break or loose of the ferrule, at the level of the at least one clinched arm. That is, this solution eliminates possibility of disconnection during crimping process since the at least one clinched arm is perpendicular to the sheet metal movement (i.e., to the movement of the ferrule, or the movement of an inner part or outer part of the ferrule). The cable shield may be used to electrically protect the first conductive wire from electric and/or electromagnetic noise.

Advantageously, the method further includes clinching the at least one clinched arm on the other of the two annular portions. This allows avoidance or reduction of any breakage of the ferrule, during or after the crimping process, as mentioned above.

Advantageously, the method further includes inserting an inner part of the ferrule below the cable shield, sliding an outer part of the ferrule above the cable shield, and sliding over, or abutting, the outer part on the inner part of the ferrule. This allows to place the ferrule over the cable shield. That is, this is particularly useful before the crimping process of the ferrule onto the cable shield.

Advantageously, the method further includes crimping at least one first arm on a conductive portion of the second conductive wire, and/or inserting at least one attachment arm in an opening of an outer part of the ferrule and bending the at least one attachment arm on the outer part.

Advantageously, the method further includes crimping at least one first arm on a conductive portion of the second conductive wire.

Advantageously, the method further has the steps consisting of inserting at least one attachment arm in an opening of an outer part of the ferrule and bending the at least one attachment arm on the outer part.

Advantageously, the method further includes crimping at least one second arm on an insulation portion of the second conductive wire. This allows to provide a simplified manufacturing of the electrical cable while improving the lifetime and the robustness of the connection.

Advantageously, the method further includes inserting an inner part of the ferrule below the cable shield and sliding an outer part of the ferrule above the cable shield and sliding over, or abutting, the outer part on the inner part of the ferrule. This allows to provide a simplified and more precise manufacturing of the electrical cable while improving the lifetime and the robustness of the connection.

In other words, the latter aspect relates to a method for manufacturing an electrical cable having the steps consisting of providing a first conductive wire with a cable shield and fastening and electrically connecting the electrical connector of the previous aspect with the cable shield and a second conductive wire.

The method may further include crimping at least one first arm on a conductive portion of the second conductive wire, inserting at least one attachment arm in an opening of an outer part of the ferrule, and bending the at least one attachment arm on the outer part.

The method may further have the steps consisting of inserting the outer part on the cable shield and abutting the outer part on an inner part of the ferrule.

Advantageously, the method further includes crimping the ferrule on the cable shield.

Advantageously, the method further includes crimping the outer part and/or the inner part on the cable shield. This allows to have a strong electrical and mechanical connection between the ferrule and the cable shield.

BRIEF DESCRIPTION OF THE DRAWINGS

The present invention will now be described, by way of example with reference to the accompanying drawings, in which.

DETAILED DESCRIPTION

Figure 1:
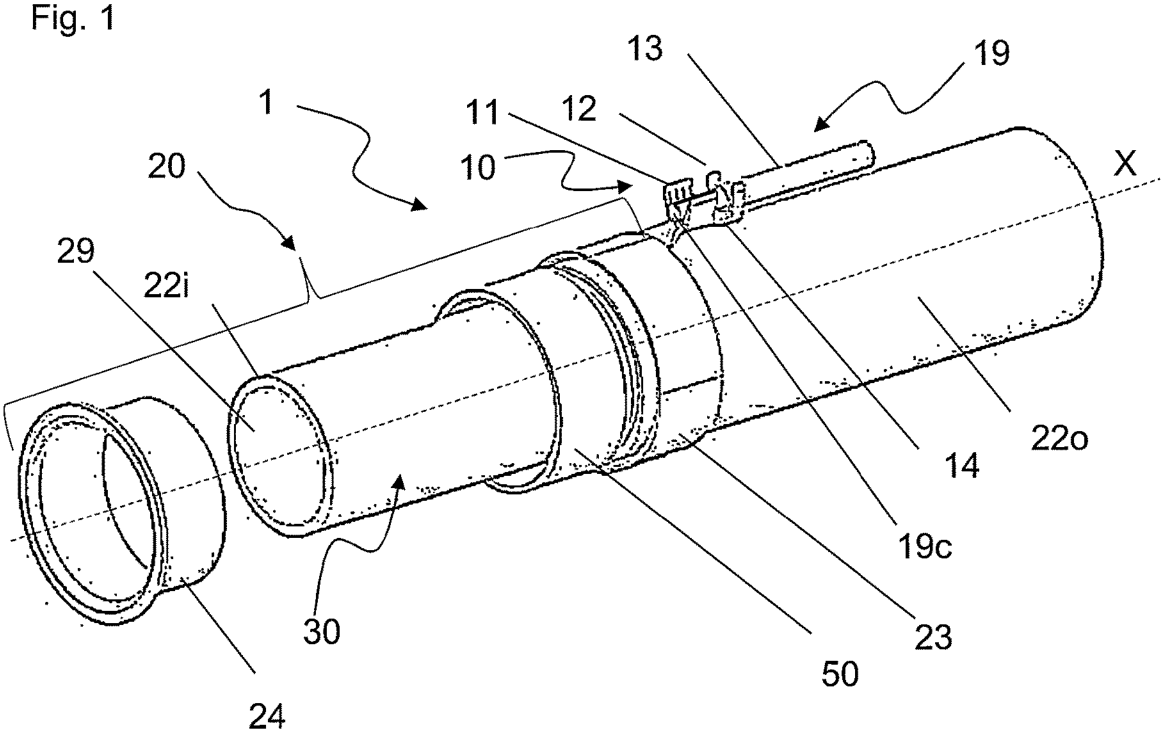
FIG. 1 represents an electrical cable and an electrical connector according to a first embodiment of the present disclosure, with an inner part of a ferrule of the electrical connector represented before introduction on the electrical cable.

FIG. 1 represents an electrical cable 1 and an electrical connector according to the first embodiment of the present disclosure, with an inner part 24 of a ferrule 20 of the electrical connector represented before introduction on the electrical cable 1.

The electrical cable 1 for high voltage current has a first conductive wire 30. The first conductive wire 30 has a conductive portion 29 made from a conductive material such as metal or copper. The conductive portion 29 is surrounded by an inner insulation 22*i* and an outer insulation 22*o*. The electrical cable cross-section (preferably the inner insulation cross section) may be for example from 10 $mm^2$ to 240 $mm^2$, without being limited to such values.

The electrical cable 1 has a cable shield 50. The cable shield 50 is sandwiched between the inner insulation 22*i* and the outer insulation 22*o*. The cable shield 50 is arranged to electrically shield the first conductive wire 30.

That is, the cable shield 50 may protect the first conductive wire 30 from outside electrical or electromagnetic noise or, protect the environment against the electrical or electromagnetic noise of the first conductive wire 30.

The electrical connector has the ferrule 20 having the inner part 24 and an outer part 23.

The inner part 24 and/or the outer part 23 of the ferrule 20 may be made from a conductive material, such as metal or steel.

The cable shield 50 may be braided and made from conductive material such as aluminium or steel. The inner insulation 22*i* and/or the outer insulation 22*o* may be made from an insulation material, such as a plastic material.

The electrical cable 1 further has a second conductive wire 19, which has a conductive portion 19*c* made from a conductive material such as metal or copper and an insulation portion 13 made from an insulation material such as a plastic material. The conductive portion 19*c* may have a cross-sectional diameter of 2.5 $mm^2$ or more, without being limited to these values.

The second conductive wire 19 will conduct the electromagnetic induced current of the cable shield 50 when the ferrule 20 is installed on the electrical cable 1.

The electrical connector has the ferrule 20 and an extended portion 10. The extended portion 10, also called crimp portion 10, has two first arms 11 and two second arms 12, the number of arms or of each type of arms being not limitative. The first arms 11 are represented in FIG. 1 in an open position, ready to be crimped (or clamped, i.e., in a closed position) onto the conductive portion 19*c* of the second conductive wire 19. The second arms 12 are represented in an open position, ready to be crimped (or clamped, i.e., in a closed position) onto the insulation portion 13 of the second conductive wire 19.

In an embodiment not illustrated, the crimp portion 10 may have two third arms clamped in a closed position in two openings of the outer part (not shown). The third arms may be inserted in the openings and then bent back on an outer surface of the outer part, to link the crimp portion 10 to the ferrule 20. In a preferred embodiment (not shown), the openings are slots, but they may also be in the shape of holes, apertures, or grooves. Otherwise, the ferrule 20 and the crimp portion 10 may be integral.

The outer part 23 may be abutted against a shoulder of the inner part 24, to be located more precisely.

The inner part 24 and the outer part 23 may be cylindrical. In a preferred embodiment, the inner part 24 and the outer part 23 may be conical.

The extended portion 10 is provided with an intermediate portion 14, linking the first arms 11 and the second arms 12.

In a preferred embodiment, the electrical cable 1 extends in a longitudinal direction X. The same applies for the electrical connector, in particular the ferrule 20 and the extended portion 10, and the second conductive wire 19.

In a preferred embodiment, the ferrule 20 is cylindrical, which means that the outer part 23 and the inner part 24 have a ring portion or sleeve portion.

Figure 2:
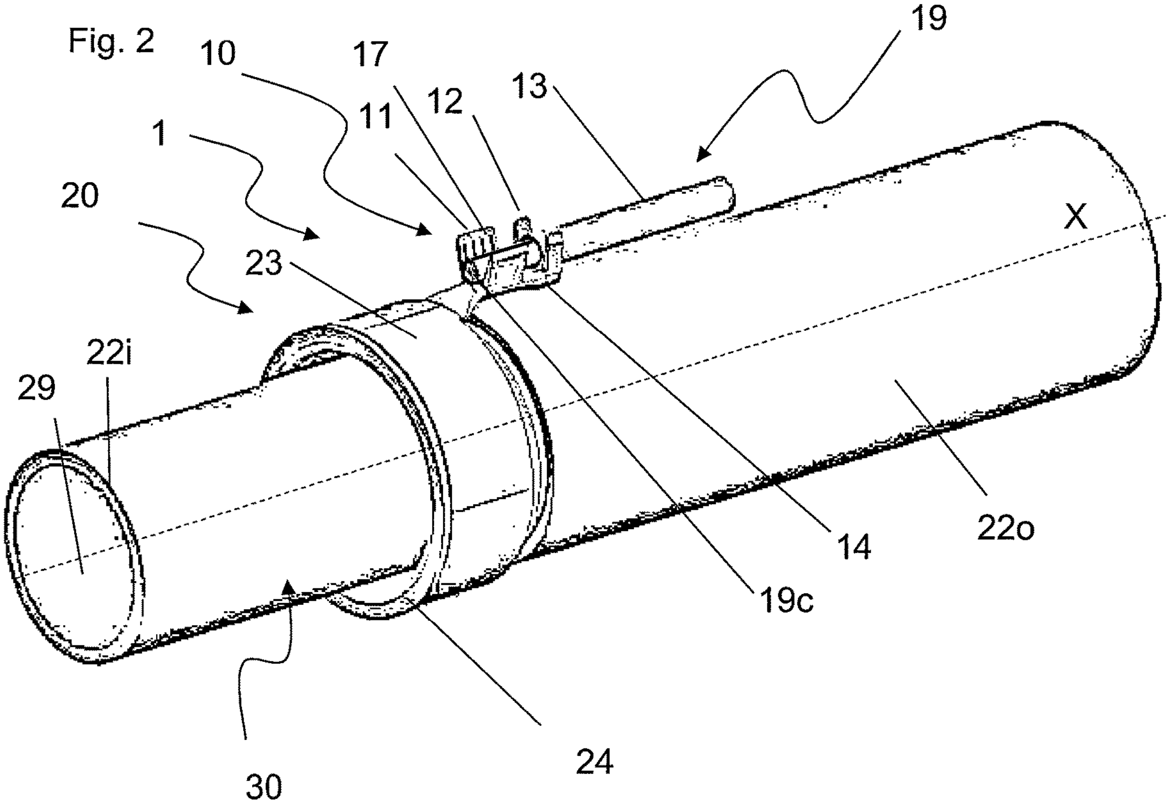
FIG. 2 represents the electrical cable and the electrical connector, with the inner part after introduction on the electrical cable.

FIG. 2 represents the electrical cable 1 and the electrical connector, with the inner part 24 after introduction on the electrical cable 1.

The reference numbers are kept as far as possible compared to other Figures and embodiments, and in the whole description.

The cable shield 50 is arranged to be sandwiched between the inner part 24 and the outer part 23, when the outer insulation 22*o* is removed on the portion of the electrical cable 1 which will receive the ferrule 20. That is to say, the cable shield 50 surrounds the inner part 24 and is surrounded by the outer part 23.

In a preferred embodiment, the inner part 24 is inserted in the cable shield 50 from a first end of the electrical cable 1, while the outer part 23 is inserted onto (or on top of) the cable shield 50 from an opposite end of the electrical cable 1, that is to say the outer part 23 is slid or slipped over or above the cable shield 50. Although it seems less practical due to the shape of the electrical shield 50, the outer part 23 may also be inserted from the same side as per the inner part 24. In this manner, the cable shield 50 is fastened by, and electrically connected with, the inner part 24 and the outer part 23. In a preferred embodiment, the ferrule 20 is crimped onto the cable shield 50, as it will be further explained in reference to FIG. 7.

The ferrule 20 may be adapted to different sizes of electrical cables (e.g., cross section) and also different sizes of cable shield. The same applies for the crimp portion 10.

Figure 3:
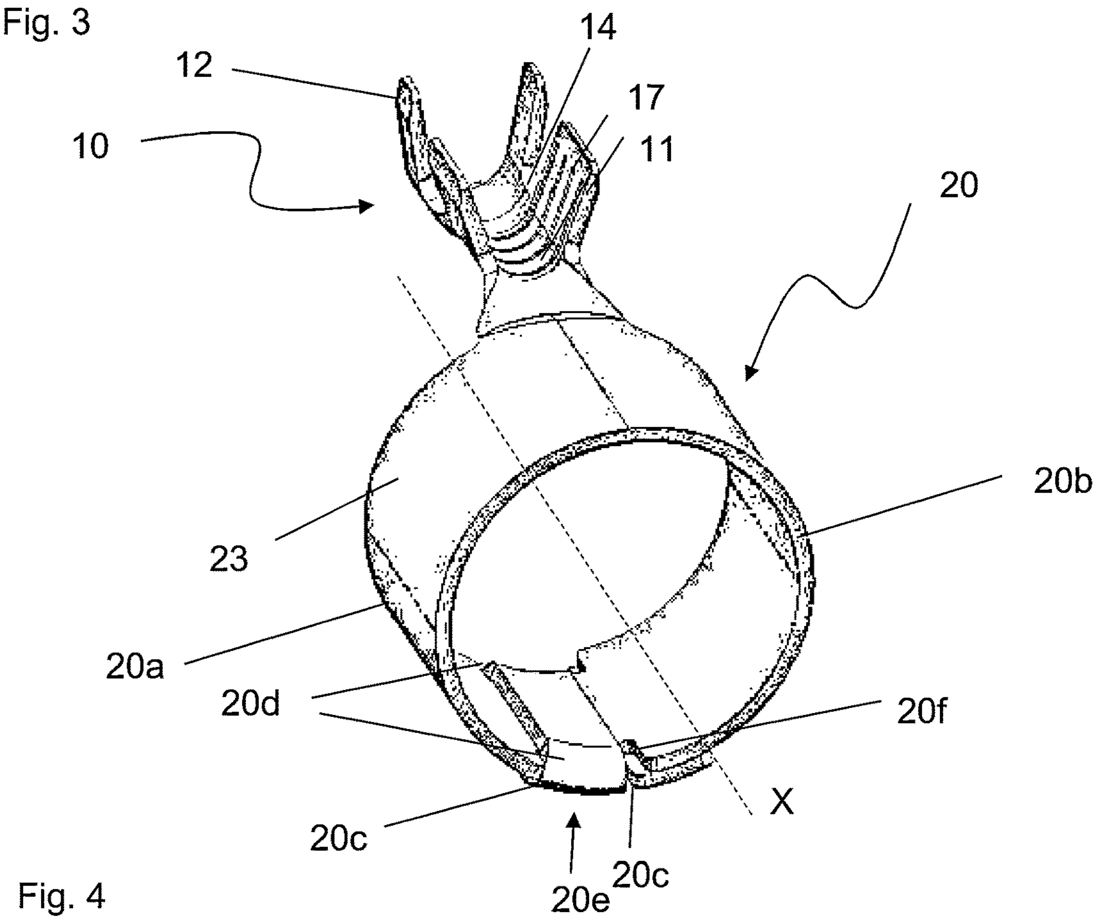
FIG. 3 represents the electrical connector, in an isometric view from the top.

FIG. 3 represents the electrical connector, in an isometric view from the top.

The ferrule 20 has the outer part 23 as mentioned above. The extended portion 10 has the first arms 11, the second arms 12 and the intermediate portion 14 therebetween.

In the embodiment with the third arms, they may be inserted in the openings of the outer part 23 and bent thereon, on the outer surface of the outer part 23, to clamp (or fix or attach or couple) the extended portion 10 with the outer part 23.

The cable shield 50 may be sandwiched between the outer part 23 and the inner part 24, and may be sandwiched, at least on a portion of the cable shield 50 between an inner (or back) portion of the third arms and the inner part.

In a preferred embodiment, the first arms 11 may be provided with at least one recess 17 (for example one, two, three or four recesses, not being limited to that numbers), so as to improve the crimping of the second conductive portion 19*c* when the first arms 11 are crimped (or pinched) thereto.

The ferrule 20 further has two annular portions 20*a*, 20*b*, and one of the two annular portions 20*a*, 20*b* has at least one clinched arm 20*d* arranged to pinch or clinch the other of the two annular portions 20*a*, 20*b*. As shown in FIG. 3, the ferrule has two clinched arms 20*d*, without being limited to such number. The clinched arm 20*d* is an arm with a folded portion as explained here after. The folded portion allows to hold in place a part onto which the clinched arm is folded, or in other words, to fix and be attached with the part. That is, the clinched arm 20*d* allows to secure (e.g., a driven nail) by bending the protruding point over or to hold together in such a manner.

The electrical cable extends in a longitudinal direction X, and the ferrule 20 is aligned such that the first conductive wire 30 extends through the ferrule 20 in the longitudinal direction X as mentioned above and the at least one clinched arm 20*d* has a free end folded along the longitudinal direction.

That is to say, the free end of the clinched arm 20*d* is folded onto the outer (radial) surface of the outer part 23 (i.e., onto the outer radial surface of the other annular portion 20*a*, 20*b*) to fix the two annular portions 20*a*, 20*b* together.

The other of the two annular portions 20*a*, 20*b* is provided with at least one abutting portion 20*c* (two in the illustration of FIG. 3). This allows to provide a better positioning of the two annular portions 20*a*, 20*b*, before, during and after the crimping process.

The other of the two annular portions 20*a*, 20*b* has at least one recess portion 20*e* (two in the illustration of FIG. 3) arranged to receive the at least one clinched arm 20*d*.

The at least one clinched arm 20*d* is arranged at an end of the one of the two annular portions 20*a*, 20*b*.

In an embodiment, the clinched arms 20*d* may be provided, for example, like this: one clinched arm 20*d* at the end (or almost end) of the annular portion, and a second clinched arm 20*d* in the middle of the annular portion (or at the beginning of the annular portion). Of course, in such case, the recess 20*e* and the abutting portion 20*c* are adapted accordingly.

The two annular portions 20*a*, 20*b* may be wound to form the general cylindrical shape of the ferrule 20.

Figure 4:
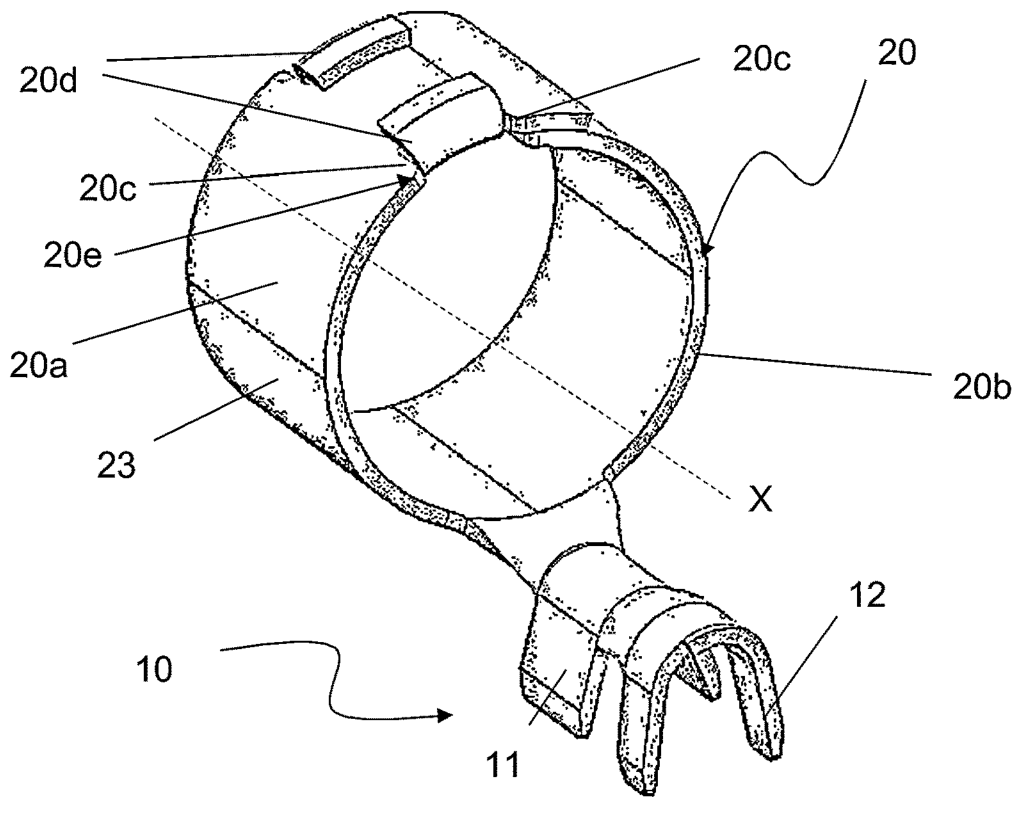
FIG. 4 represents the electrical connector, in an isometric view from the bottom.

FIG. 4 represents the electrical connector, in an isometric view from the bottom.

The reference numbers are kept as far as possible compared to other Figures and embodiments, and in the whole description.

The clinched arms 20*d* are folded along the longitudinal direction, which is to say the rotation axis during the folding or the bending of the clinched arms 20*d* onto the other annular portion 20*a*, 20*b* is perpendicular to the longitudinal direction.

Preferably, the two clinched arms 20*d* are opposite to each other, when folded on the other of the annular portions 20*a*, 20*b*. The one of the annular portions 20*a*, 20*b* is provided with a gap between the clinched arm 20*d* and the rest of the annular portion 20*a*, 20*b*, to ease the folding of the clinched arm 20*d*.

In the illustration of FIG. 4, the clinched arms 20*d* are provided on the annular portion 20*b*, while the recesses 20*e* and the abutting portions 20*c* are provided on the annular portion 20*a*. Of course, it is possible to exchange the annular portions 20*a* and 20*b*.

Figure 5A:
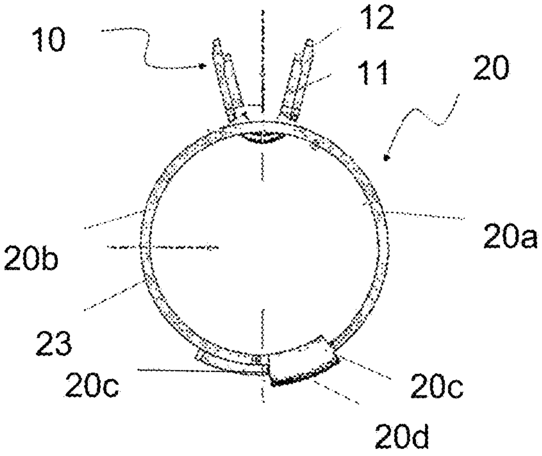
FIGS. 5A and 5B represents the electrical connector, in a view from the longitudinal direction, and a lateral cross-section view.
Figure 5B:
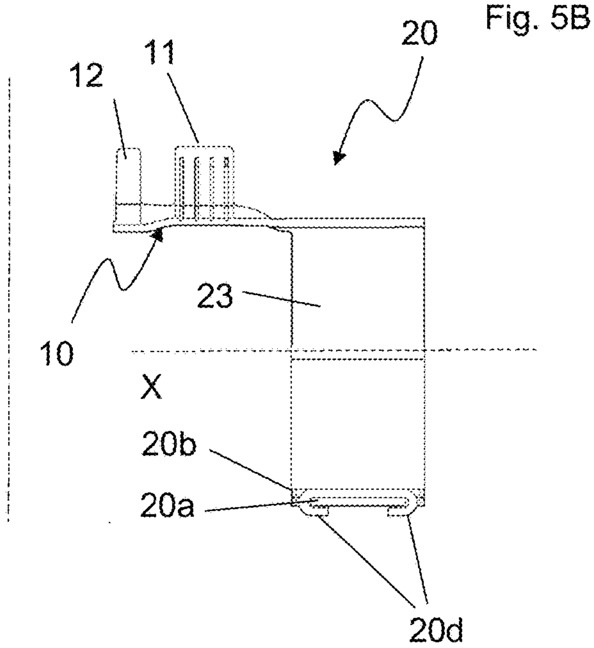

FIGS. 5A and 5B represents the electrical connector, in a view from the longitudinal direction and a lateral cross-section view.

The reference numbers are kept as far as possible compared to other Figures and embodiments, and in the whole description.

FIGS. 5A and 5B illustrate the folding of the clinched arm 20*d* onto the other of the annular portion 20*a*, 20*b*.

Figure 6:
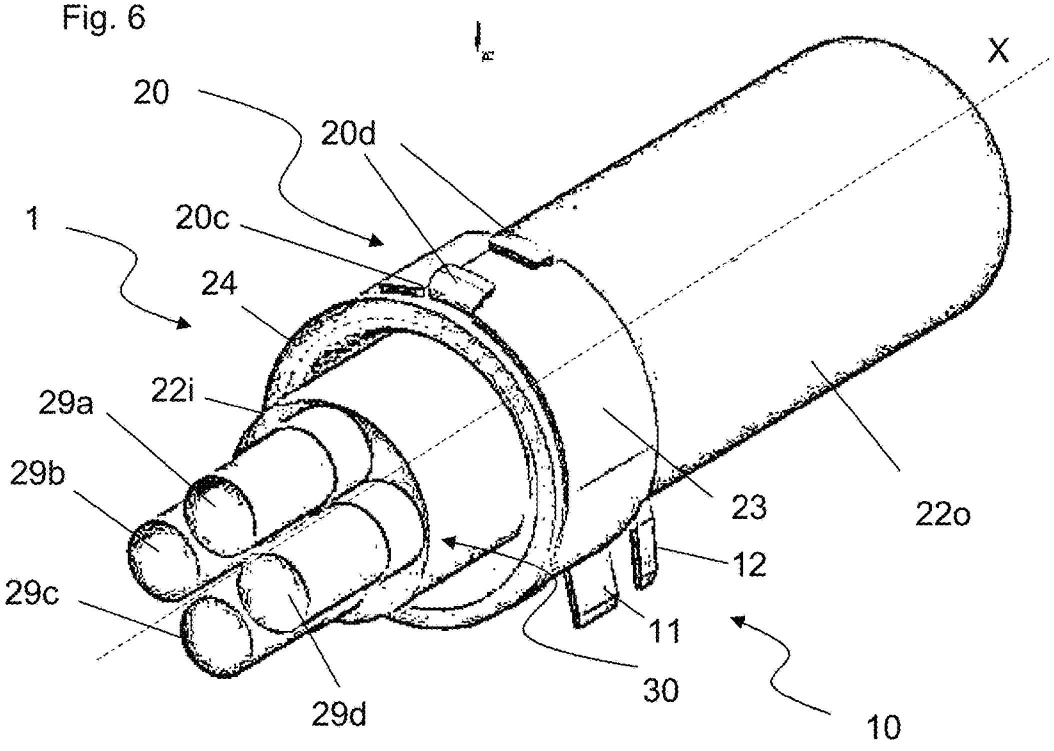
FIG. 6 represents the electrical cable and the electrical connector according to a second embodiment of the present disclosure in which the electrical cable has a plurality of conductive wire strands therein.

FIG. 6 represents the electrical cable 1 and the electrical connector according to the second embodiment in which the first conductive wire 30 has a plurality of wire strands 29*a*-29*d*. Each wire strand acts as a conductive portion.

Figure 7:
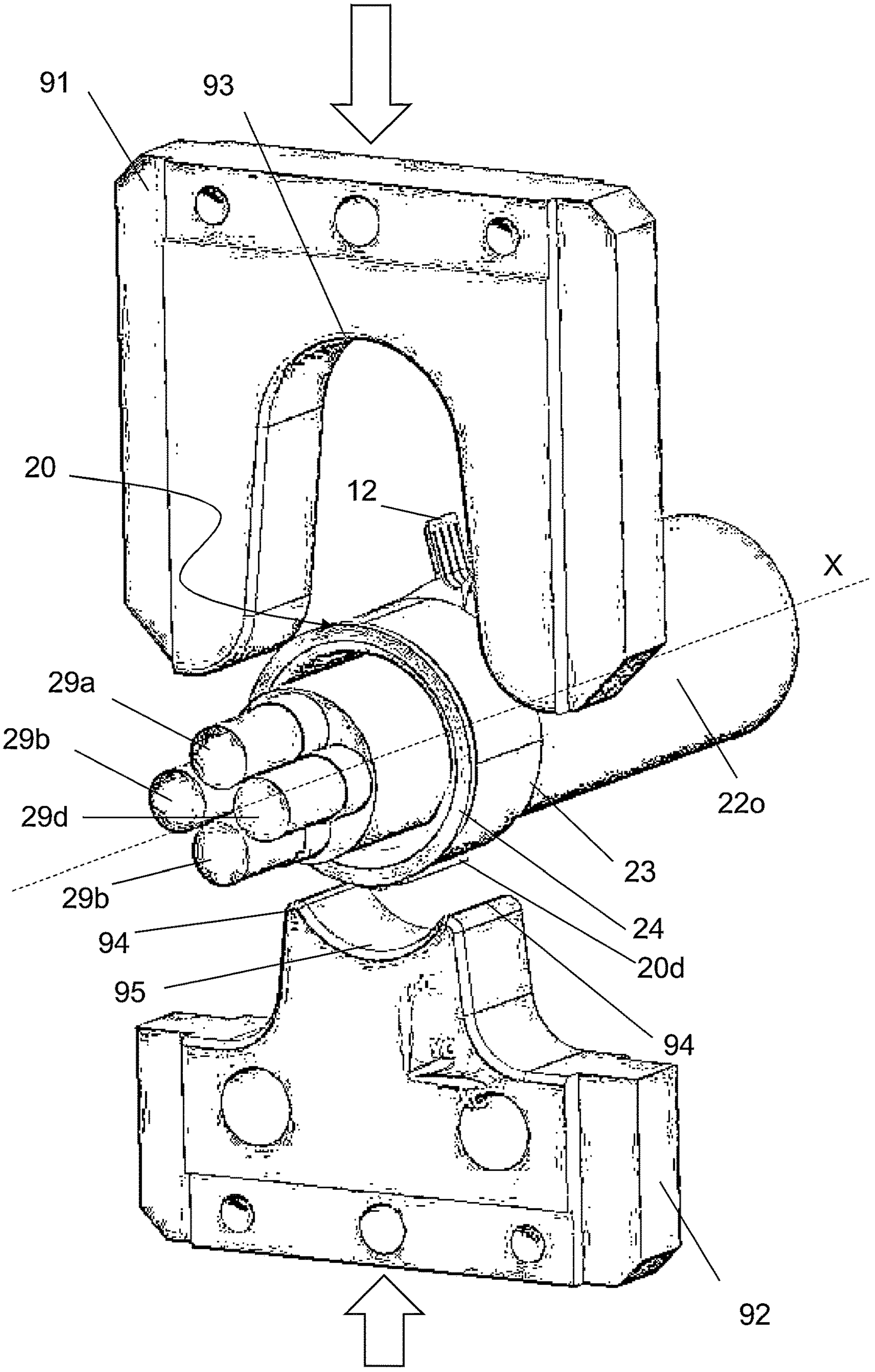
FIG. 7 is a diagram illustrating a method for crimping the electrical connector onto an electrical shield of the electrical cable.

FIG. 7 is a diagram illustrating a method for crimping the electrical connector onto an electrical shield of the electrical cable.

The electrical cable 1 and the electrical connector are inserted into an upper half 91 and a bottom half 92 of a tool for crimping the electrical connector onto the cable shield 50 (hidden by the ferrule 20 in the FIG. 7).

The upper half 91 and the bottom half 92 can be pressed together to crimp the ferrule 20 onto the cable shield 50. Indentations 94 of the bottom half 92 may help to better crimp the ferrule 20 onto the cable shield 50, by creating bulged portion on the ferrule 20 (on the outer part 23).

The upper half 91 has an upper receiving portion 93 to receive the upper portion of the ferrule 20 and allow to press the ferrule 20 between the receiving portion 93 and a bottom receiving portion 95 (receiving a bottom portion of the ferrule 20).

The indentations 94 may push the outer part 23 upward, and it is desirable that the fixing system (here the clinched arm 20*d*) resists to, or is able to avoid (or limit), such upward movement, leading to a radial movement of the outer part 23 in front or nearby the bottom receiving portion 95.

As the clinched arms 20 are folded along the longitudinal direction X, the stress on the ferrule 20 and on the clinched arm 20 is limited or reduced, and accordingly damage to the ferrule 20 is avoided or limited.

This solution eliminates the possibility of disconnection during the crimping process because clinched arms are perpendicular to the sheet metal movement (i.e., the sheet metal of the ferrule 20, that is to say the outer part 23 and/or the inner part 24).

Figure 8:
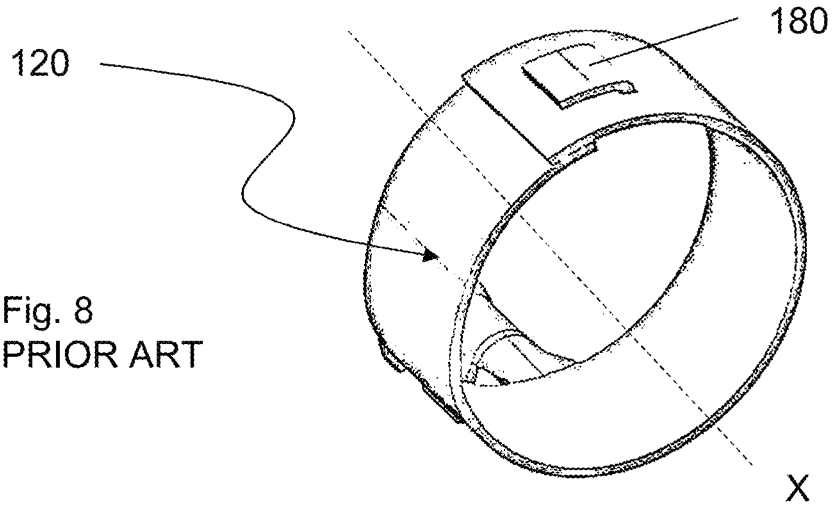
Fig. 8 PRIOR ART
FIG. 8 represents a conventional ferrule with a protrusion.

FIG. 8 represents a conventional ferrule with a protrusion.

As shown in FIG. 8, a ferrule 120 is provided with a protrusion to fix two wound portions of the ferrule. The protrusion 180 may be broken or weaken during the crimping process, due to the orientation of the folding with a rotation axis in the longitudinal direction X.

Figure 9:
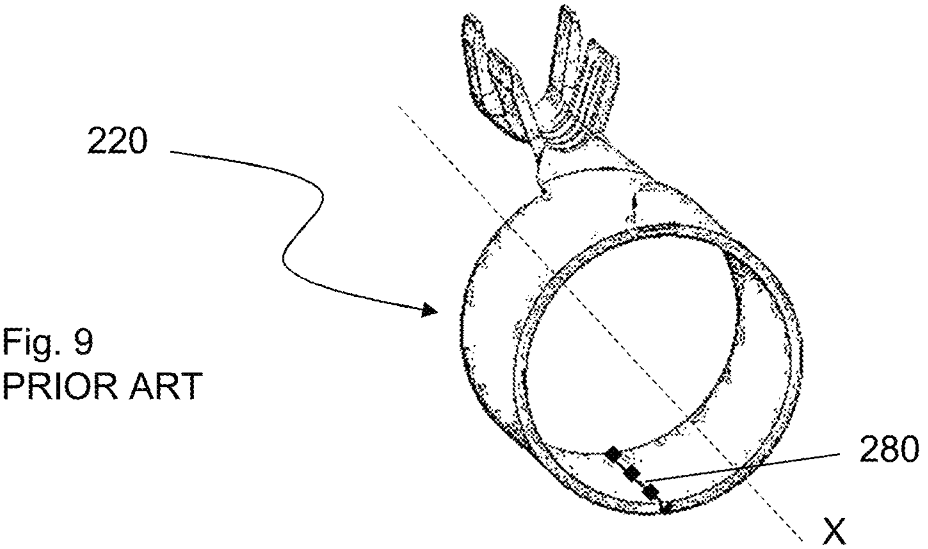
Fig. 9 PRIOR ART
FIG. 9 represents a conventional electrical connector with a weld.

FIG. 9 represents a conventional electrical connector with a weld.

The ferrule 220 has a weld 280 (long weld or spot weld) to fix two wound portions of the ferrule.

However, in the two latter ferrule 120 and 220, there is a problem of break or reopening of the ferrule when the ferrule is crimped on the electrical shield, when this crimping is done thanks to a press, a tool or the like, or when there are vibrations in use.

That is, the electrical connection between the ferrule and the electrical shield is poor or lost, and the ferrule may fall from the wire or from the electrical shield on which it is crimped.

In addition, there is the possibility to provide the weld 280 on an inner side and on an outer side of the ferrule 220, but it is both not sufficient and costly. The same applies even the weld 280 is fully penetrating the ring of the ferrule 220, to have a complete welding: this may not be sufficient to avoid a break of the weld, and this is also time consuming and costly.

Figure 10:
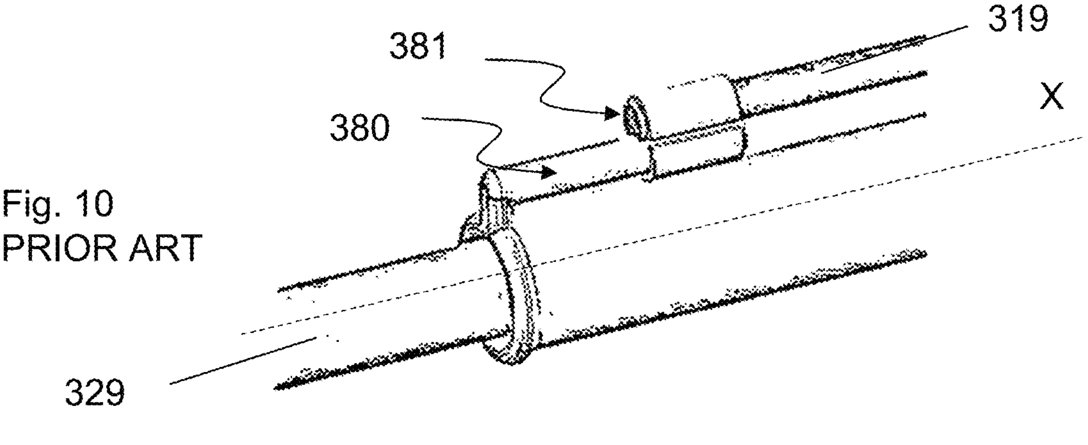
Fig. 10 PRIOR ART
FIG. 10 represents a conventional electrical connector with a clip.

FIG. 10 represents a conventional electrical connector with a clip.

The cable shield provided with an outer portion 380 in the longitudinal direction X, along with a clip 381 for assembling the outer portion of the electrical shield with an accessory cable 319 (i.e., second cable 319) configured to connect with the electrical shield, to perform the function of shielding.

That is, with the clip 381, there is a risk to loosen the electrical connection between the braids of both the electrical shield and the accessory cable.

Further, there is a risk of unstable connection resistance, which varies after every cable movement, and a risk of loosening or breaking of the accessory cable, at the level of the clip. The same applies with an assembly with a shrinking tube instead of the clip 381.

It is of course understood that obvious improvements and/or modifications for one skilled in the art may be implemented, still being under the scope of the disclosure as it is defined by the appended claims. The embodiments may be combined whenever possible. The steps may be combined and/or inverted whenever possible.

The invention claimed is:

1. An electrical connector, comprising:

a ferrule configured to receive at least a portion of a first conductive wire of a high voltage electrical cable, wherein the ferrule is configured to fasten to a cable shield configured to electrically shield the first conductive wire of the high voltage electrical cable and electrically connect the cable shield with a second conductive wire of the high voltage electrical cable, wherein the ferrule has two annular portions, and one of the two annular portions has at least one clinched arm arranged to pinch or clinch the other of the two annular portions, and wherein the ferrule is aligned such that the first conductive wire extends through the ferrule in a longitudinal direction and the at least one clinched arm has a free end folded along the longitudinal direction; and a crimp portion configured to be connected to the ferrule and configured for crimping the second conductive wire of the high voltage electrical cable.

2. The electrical connector according to claim 1, wherein a rotation axis of the clinched arm during bending or folding of the at least one clinched arm is perpendicular to the longitudinal direction.

3. The electrical connector according to claim 1, wherein the other of the two annular portions has at least one abutting portion arranged to abut with the at least one clinched arm.

4. The electrical connector according to claim 1, wherein the other of the two annular portions has at least one recess portion arranged to receive the at least one clinched arm.

5. The electrical connector according to claim 1, wherein the at least one clinched arm is arranged at an end of the one of the two annular portions.

6. The electrical connector according to claim 1, wherein the ferrule is arranged to be crimped on a portion of the cable shield.

7. The electrical connector according to claim 6, wherein the ferrule has an inner part and an outer part, and wherein the ferrule is arranged to sandwich the portion of the cable shield between the inner part and the outer part.

8. The electrical connector according to claim 7, wherein the inner part has a shoulder portion arranged to abut the outer part.

9. The electrical connector according to claim 1, wherein the crimp portion has at least one first arm arranged to be crimped on a conductive portion of the second conductive wire.

10. The electrical connector according to claim 1, wherein the crimp portion has at least one second arm arranged to be crimped on an insulation portion of the second conductive wire.

11. The electrical connector according to claim 1, wherein the crimp portion is integral with the ferrule.

12. A method for manufacturing an electrical cable comprising:

providing a high voltage electrical cable having a first conductive wire with a cable shield and a second conductive wire, providing an electrical connector having a ferrule configured to receive at least a portion of a first conductive wire of a high voltage electrical cable, wherein the ferrule is configured to fasten to a cable shield configured to electrically shield the first conductive wire of the high voltage electrical cable and electrically connect the cable shield with a second conductive wire of the high voltage electrical cable, wherein the ferrule has two annular portions, and one of the two annular portions has at least one clinched arm arranged to pinch or clinch the other of the two annular portions, and wherein the ferrule is aligned such that the first conductive wire extends through the ferrule in a longitudinal direction and the at least one clinched arm has a free end folded along the longitudinal direction, wherein the electrical connector further has a crimp portion configured to be connected to the ferrule and configured for crimping the second conductive wire of the high voltage electrical cable; and fastening and electrically connecting the electrical connector with the cable shield and a second conductive wire.

13. The method according to claim 12, further comprising:

clinching the at least one clinched arm on the other of the two annular portions.

14. The method according to claim 12, further comprising:

inserting an inner part of the ferrule below the cable shield, sliding an outer part of the ferrule above the cable shield; and sliding over, or abutting, the outer part on the inner part of the ferrule.

15. The method according to claim 12, further comprising:

crimping the ferrule on the cable shield.

16. The method according to claim 12, further comprising:

crimping at least one first arm on a conductive portion of the second conductive wire.

* * * * *